United States Patent [19]

Cacace et al.

[11] 3,774,289

[45] Nov. 27, 1973

[54] PROCESSING OF SCRAP METAL

[75] Inventors: Alfredo Luigi Adolfo Cacace; Antonino Giorgio Cacace, both of Johannesburg, Transvaal, Republic of South Africa

[73] Assignee: Antonsteel (Proprietary) Limited, Johannesburg, Republic of South Africa

[22] Filed: Sept. 9, 1970

[21] Appl. No.: 70,780

[30] Foreign Application Priority Data
Sept. 9, 1969 South Africa...................... 69/6388
Mar. 25, 1970 South Africa...................... 70/2047
May 26, 1970 South Africa...................... 70/3585

[52] U.S. Cl.............. 29/403, 29/420.5, 29/DIG. 32
[51] Int. Cl............................................. B23q 17/00
[58] Field of Search................... 29/403, 420, 420.5, 29/DIG. 32, DIG. 47

[56] References Cited
UNITED STATES PATENTS
2,290,734  7/1942  Brassert................................ 29/420
2,383,766  8/1945  Brasset............................. 29/420 X
2,240,821  5/1941  Young .............................. 29/403 X
99,574  2/1870  Jones ..................................... 29/403
209,470  10/1878  Edwards .............................. 29/403

FOREIGN PATENTS OR APPLICATIONS
7,081  4/1905  Great Britain....................... 29/403

Primary Examiner—Charles W. Lanham
Assistant Examiner—D. C. Reiley, III
Attorney—Waters, Roditi, Schwartz and Nissen

[57] ABSTRACT

Solid state processing of scrap metal cuttings. The cuttings are compacted, conveniently at room temperature, and then jacketed in a substantially air tight jacket. Matter, such as graphite, which gives off a reducing gas is also introduced in the jacket which is then heated so that the reducing gas reduces the surface oxides present in the scrap. The jacketed mass is then hot worked, e.g., by rolling to form a homogeneous mass.

2 Claims, 2 Drawing Figures

PROCESSING OF SCRAP METAL

This invention relates to the processing of metal scrap.

The disposal of metal scrap in the form of cuttings such as turnings, borings, sawings and the like, as well as of off cuts from sheet-metal sheets is a constant problem. These cuttings have a high surface area to volume ratio and are very prone to oxidation. They are bulky and difficult to handle. Furthermore, a high percentage of the scrap metal is lost when cuttings of this nature are remelted.

These problems are particularly marked in the case of steel scrap if for no other reason than that steel forms a very high percentage of the different metals used in industry.

A number of proposals have previously been made to render the re-use of metal scrap possible without remelting it. In one process, a mass of cuttings is consolidated and subsequently hot forged into a billet and thereafter rolling the billet into a product. Some prior proposals suggest that it is possible to consolidate a mass of cuttings and subsequently press these cuttings in a die to form a pressed billet. All of these proposals produce a product of uncertain metallurgical quality and of generally poor surface appearance. The difficulties involved have been such that, to the applicant's knowledge, none of the processes is in commercial use.

The reason for the occurrence of these problems is almost certainly the presence of oxide on the surface of the scrap. The term oxide includes rust for the purposes of this specification. During the course of experiments connected with the present invention, it was found that no matter how clean the scrap was before use, i.e. clean of oxides and rust as well as of foreign matter such as oil, grease and the like, the difficulties persisted. The conclusion drawn was that, even if the consolidated mass was heated in a reducing atmosphere prior to hot-working, sufficient oxidation occurs during the transference of the heated mass to the press to render the process in that form unworkable, due to the oxide inclusions occuring in the final product.

It is an object of the present invention to provide a process in which these difficulties are obviated.

According to the invention, there is provided a process for producing a substantially homogeneous product from scrap metal cuttings, including the steps of:
a. compacting a quantity of the scrap metal cuttings, at a temperature below that at which a significant degree of oxidation can take place, into a mass having a density of at least about 50 percent of the density of a homogeneous mass of the same metal:
b. jacketing the mass in a substantially airtight jacket;
c. causing a reducing gas to be present within the jacket and, by applying heat, causing the gas to reduce surface oxides present on the scrap; and
d. hot-working the de-oxidised jacketed mass to form the homogeneous product.

The compaction can be carried out at room temperature. The degree of compaction is desirably as high as economically possible without being so high that the reducing gas cannot penetrate the interstices between the cuttings. Also, it has been found that some degree of compaction is necessary.

This is so because it is obviously in many circumstances desirable that the jacket should be as thin as possible. If the cuttings are not compacted, a thin-walled jacket frequently ruptures under the pressure of the subsequent hot-working, rendering the billet useless. It is considered that for a thin jacket, 60 percent compaction is about the minimum degree of compaction, from the point of view of economics, although 50 percent compaction is still workable. However, 80 percent is a good working compaction from the point of view not only of economics but also for ensuring that the compacted mass is strong enough to prevent the rupture of the jacket.

It is a feature of the invention that the cuttings can be compacted before being jacketed. Furthermore, this step can be carried out in a commercially available briquetting machine. If a large billet is required, a number of briquettes can be introduced into the jacket and again compacted before the jacket is closed. One of the incidental advantages of the process is that the jacket can be in the form of a pipe which can fit snugly into the pressing die. The presence of the jacket renders die wear negligible.

The reducing gas can be introduced into the jacket in any suitable manner. One of the most convenient methods of achieving this is to introduce a solid substance into the jacket before the scrap is inserted therein. This substance then combines with another substance in the jacket to evolve the reducing gas. A very convenient such substance is carbon. This can be in the form of graphite powder or, when medium or high-carbon steel scrap is used, there is sufficient CO generated by the decarburisation of the steel when heated to reduce all the oxide.

It is desirable, if not essential, to allow excess reducing gas to escape from the jacket. It has been found during the course of experiments carried out in connection with this invention that if the jacket ends are simply folded over the compacted mass or "beaded" over end plates inserted in the jacket ends, so that the mass is completely covered, this will normally provide a sufficient degree of protection from oxidation, while allowing the excess reducing gas to escape. This is a particularly convenient method in the case of a thin walled jacket. For a thick walled jacket, it may be desirable to weld a plug in each end of the jacket. In this case it will be necessary to provide a vent hole in the plug or jacket.

Another very important feature of the present invention is that the jacket can be converted, in the hot-worked product, into a corrosion resistant external layer. To this end, the invention provides that the jacket be of corrosion resistant metal, for example stainless steel. It has been found, due to the very even degree of compaction obtainable by the use of briquettes, the jacket remains on the outer surface of the compacted mass during hot-working, and in the final product forms an evenly spread external layer over the final product. Clearly the jacket must be thick enough to provide this result. Equally the cross-sectional shape of the product must not be too complex. For bars of round or square section, however, the thickness of the outer layer is surprisingly constant.

It is envisaged that a step of cleaning the cuttings prior to compaction will normally be carried out. Furthermore, the cuttings will normally be reduced to chip form before being compacted.

As has already been mentioned, the process of the invention is applicable to any suitable form of cuttings, but is particularly convenient for cuttings in the form of turnings, borings, sawings and the like.

Another feature of the invention is that the process can be applied to hot-working in the form of rolling. Because of the very high local pressure applied by the rolls to a billet, it is necessary that the billet be reasonably strong. This can be achieved by hot compaction in the case of a billet which is not jacketed, but the jacket, especially if it is of relatively large wall thickness, renders this hot-compaction unnecessary and even a disadvantage because of the increased danger of oxidation.

A further feature of the invention is that the process can be applied to hot-working in the form of extruding the material. With this process there is hot compaction of the jacketed billet in a conventional extrusion press and thereafter the billet is extruded into any plain or hollow section as tube. In such a case the jacket wall need not be of large thickness as it is supported by the walls of the extrusion press cylinder and this will make the production of steel more economical.

In an embodiment of the invention, steel turnings in their most economical form are used. In this form they have undergone no consolidation of compaction at all and are consequently very bulky and springy. The steel turnings are reduced in size in a chipping machine into lengths of about 3 cm or less. The chips are then cleaned from oil-emulsion, grease, soil and rags by washing with organic solvents. Alternatively they may be steam degreased, and hot-air dried. If the only impurity is the oil-emulsion, they may simply be centrifugally cleaned.

The chips are then converted into briquette form in a commercial briquetting machine. Prior to briquetting, very fine grain powdered graphite in a proportion of 0.1 percent to 0.05 percent by weight of graphite to chips, is added to the chips. The briquettes are then placed in a close fitting tube and pressed together at room temperature. The density of the compacted chips in the tube is desirably at least about 80 percent of the weight of a solid steel compact of the same size the equivalent density of the briquettes being at least about 60 percent. The pressing operation is carried out so that pressing is achieved by two rams which press directly onto the chips from either end of the tube, the tube being supported in a die. A thin graphite film can be placed on the inside and outside of the tube to provide lubrication.

It is also possible to insert the chips loose into the tube and then to compact them. In this case several operations of inserting chips and then pressing are required, the pressing operations prior to the final one being carried out at a pressure lower than that used in the final one.

The billet is then heated up so that it attains a uniform temperature of 1,250° C, by any convenient means. A protective atmosphere can be used while heating if required. During heating the graphite in the tube forms carbon monoxide which reduces all surface oxide films and rust present on the chips and ensures that any subsequent hot-working such as hot rolling is carried out under a reducing atmosphere inside the tube. The formation of CO from C and $CO_2$ or C and $O_2$ results in two molecules of CO from each molecule of $CO_2$ or $O_2$. As a result the pressure inside the tube is always higher than outside the tube, ensuring that a reducing atmosphere is always present within the tube.

It is very common to find that steel turnings are of medium or high carbon steels. In the case of such steels it is possible to omit graphite powder altogether. In this case, the steel decarburises thus providing the source of carbon necessary for the production of CO.

The billet can be of any convenient size. Up to the present time, a billet of 180 mm in diameter and 1,000 mm in length, weighing about 170 Kgm, is the maximum size produced by the applicants.

EXPERIMENT 1

Figure 1:
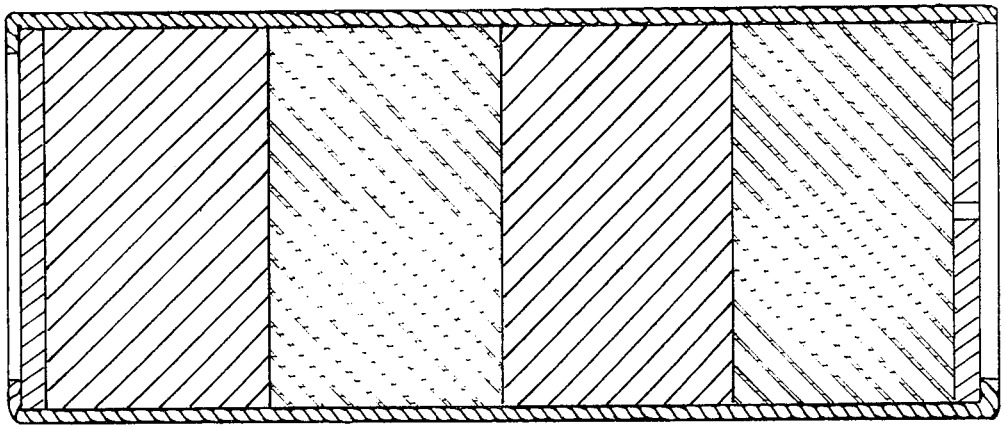
FIG. 1 is a sectional view of the product of scrap metal cuttings wherein the jacket ends have been folded over end plates at opposite ends of the compacted cuttings.
Figure 2:
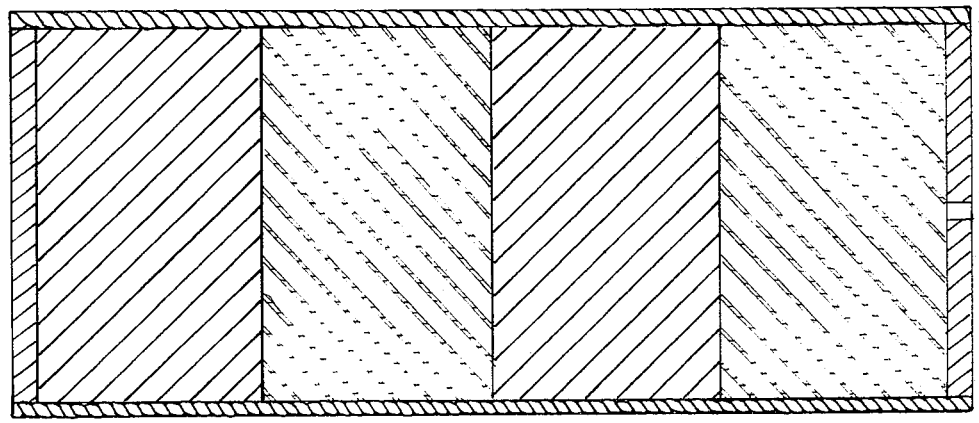
FIG. 2 is a sectional view of the product of scrap metal cuttings wherein the jacket ends are welded to plugs at opposite ends of the compacted cuttings.

In a typical experiment to observe the reducing action of carbon monoxide on rust and oxide films on steel turnings, the following procedure was carried out:

Eight specimens were prepared consisting of four briquettes prepared from heavily rusted steel turnings and four briquettes prepared from non-rusted turnings. Two of each batch contained graphite powder mixed with the turnings in the proportion of 0.1 percent by weight. The briquettes were 10 cms in diameter and 6 cms in height. The briquettes were then placed into tight fitting cylindrical containers and the containers were then sealed. A hole of 2mm in diameter was drilled in the top of each container. Four of the containers were selected; the first containing the rusted swarf plus graphite; the second containing rusted swarf with no graphite; the third containing non-rusted swarf covered with the well-known blue oxide film plus graphite, and the fourth containing the same as the third except with no graphite. These four speciments were placed into a small furnace and heated gradually up to 1,200° C over three hours.

They were then removed from the furnace and the small holes in the containers sealed by welding. The containers were then rapidly cooled by immersing them in a bath of oil. The other four containers containing similar contents were placed into the hot furnace at 1,200° C and heated for one hour. The same procedure was observed for cooling as for the first four containers. All eight containers were opened. Very bright steel turnings were observed in all of them, indicating that complete reduction had occurred.

The containers with graphite contained turnings where were less pliable in bending and more brittle than the turnings with no graphite indicating that carburisation had occurred to a slight extent. The steel turnings had sintered together to some extent; and it was possible to saw through the sintered briquettes with a power saw. On crushing a sawed slice of briquette with an hydraulic press the turnings at the inner centre of the slice were as bright as those at the exterior of the briquette.

Experiment 1 indicates the state of steel turnings just prior to hot working. Completely reduced surfaces on the turnings ensure that sound welding between surfaces will occur when hot worked, and the reducing atmosphere that no oxide inclusions can possibly occur, during hot working.

Experiment 2

In a typical experiment to produce a section the following procedure was observed. Briquettes pressed to a density of 65 percent were produced from prepared turnings, mixed with 0.1 percent graphite. The briquettes were 10 cms in diameter and 8 cms in height and had a mean weight of about 4 Kgms each. Four of these briquettes were placed in a tube of inner diameter 10.4 cms and exterior diameter 11 cms. The tube was 36 cms in length and had a thin film of graphite painted on the interior and exterior of the walls of the tube.

The filled tube was placed in a steel die of inner diameter 11.2 cms, thickness of 7 cms and length of 35 cms. Two close fitting rams were placed in the open ends of the tube so that they pressed directly on the column of swarf in the tube. A primary pressing was applied and then a longer ram was placed in the bottom end of the tube so that a "floating die" action is achieved when giving the maximum pressure to a density of 80 to 85 percent. The tube was then pressed out of the steel die. The tube ends were sawed off flush with the surfaces of compacted steel turnings and two discs of steel of similar thickness to the tube were welded on the open ends of the tube.

A hole of 2 mm in diameter was drilled in each of the steel discs.

The billet was heated in a conventional reheating furnace up to 1,200° C over three hours. A blue flame was observed burning at each of the holes drilled in the disc, indicating the expulsion of carbon monoxide from the interior of the tube. The billet was then rolled in a conventional + three-high merchant mill with a primary passage designed for a square billet of dimensions 11.3 cm square. A reduction of 2 mm on the diagonal was effected through each of the first eight passages of the mill. The billet was reduced down to a rectangular section of 5 mm × 10 mm and a length of about 15 m. The surface appearance was perfect and no difference between conventionally produced steel and the steel produced by the present method could be visually observed.

Sections of length 30 cms were cut along the entire length of the bar and were subjected to tensile tests. Pieces of bar in length and also cross-section were polished and etched and were subjected to metallographical examinations and photographs. The micrographs indicate very clear junctions along which the swarf particles have welded together. No oxide inclusions are visible.

Table 1 indicates the physical properties of lengths of bar:

TABLE 1

| Bar No. | % elongation over 2 inches at fracture | Approx. Yield stress K.P.S.I. | Ultimate Tensile Stress K.P.S.I. |
|---|---|---|---|
| 1 | 10.40 | 54.50 | 79.50 |
| 2 | 11.05 | 52.50 | 75.40 |
| 3 | 10.04 | 56.00 | 77.90 |
| 4 | 11.10 | 54.00 | 77.00 |
| 5 | 8.90 | 62.00 | 79.40 |
| 6 | 8.85 | 62.75 | 80.30 |

Experiment 3

A stainless steel tube of outside diameter 110 mm, thickness 6.35 mm and length 360 mm was employed and the same procedure as in Experiment 2 was observed except that loose swarf and not briquettes was inserted and pressed.

When the tube was sufficiently filled with compacted turnings the full pressure was applied and the billet removed. The same rolling procedure was observed as in the case of Experiment 2 except that an intermediate heating of the billet was necessary as the stainless steel exterior cooled more rapidly than the former mild steel exterior.

The rolled product was perfect and on polishing and etching a cross-section of the 3.5 cms × 1 cm bar, the outer stainless steel jacket could be distinctly discernible as an unetched uniform unbroken white layer of about 2 mm to 3.5 mm which was perfectly welded onto the core.

Experiment 4

The same procedure as in Experiment 2 was observed except that the billet was hot pressed to about 100 percent compaction prior to rolling. However, during hot pressing oxidation occurred to a slight extent and the surface of the rolled product was not as satisfactory as that in Experiment 2.

Experiment 5

80 percent compaction briquettes were placed in a tube without pressing similar to that employed in Experiment 2. The billet was then rolled. A good rolled product resulted.

Experiment 6

Experiment 2 was repeated with medium carbon steel and without the addition of graphite. Results from the Tensile Test indicate better elongation values.

TABLE 2

| Bar | Yield Point Tons/sq. in. | elongation % 1.5" | Ultimate tensile stress tons/sq.in. |
|---|---|---|---|
| 1 | 31 | 17 | 39 |
| 2 | 28.5 | 12 | 34 |

Many experiments similar to those described in Experiments 2 to 6 were carried out. No section that was tested in tension gave tensile properties inferior to those given in table 1 and table 2. These physical properties are representative of a high tensile steel class of section.

This new steel making method lends itself to a very economical industrial process of producing high tensile steel.

The method is unique for the production of stainless steel-clad high tensile steel. Many applications especially in the chemical industries where costs are prohibitive if stainless steel sections are employed could make use of stainless steel-clad steel sections. Stainless steel cladding would represent about 10 to 20 percent of the weight of the clad steel.

For the purposes of this specification a homogeneous product should be understood to mean a product in which the constituent pieces of metal are welded or fused together.

We claim:

1. A process for producing a substantially homogeneous product from scrap metal cuttings on which surface oxide is present and which cuttings include residual carbonaceous material therein as an original constituent, including the steps of
   a. compacting a quantity of the scrap metal cuttings substantially free of extraneous carbonaceous material at a temperature below that at which a significant degree of oxidation can take place, into a mass having a density of at least about 50 percent of the density of a homogeneous mass of the metal;
   b. jacketing the mass in a jacket which substantially prevents the penetration of extraneous air to the mass;
   c. heating the jacketed mass to a temperature and for a time sufficient to cause the carbonaceous material contained within the jacket to effect reduction of the surface oxides;
   d. hot-working the deoxidised jacketed mass to form the homogeneous product.

2. A process according to claim 1 in which substantially all of the cuttings are steel.

* * * * *